(12) United States Patent
Stauvermann et al.

(10) Patent No.: US 8,950,523 B2
(45) Date of Patent: Feb. 10, 2015

(54) DRIVE TRAIN BETWEEN THE POWER TAKE-OFF SHAFT OF A TRACTOR UNIT AND THE GEARBOX OF A TRAILER VEHICLE

(71) Applicant: GKN Walterscheid GmbH, Lohmar (DE)

(72) Inventors: Frank Stauvermann, Metelen (DE); Patrick Büth, Much (DE); Richard Kleine-Nieβe, Lienen (DE)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 13/675,382

(22) Filed: Nov. 13, 2012

(65) Prior Publication Data
US 2013/0140098 A1     Jun. 6, 2013

(30) Foreign Application Priority Data
Nov. 10, 2011    (DE) .......................... 10 2011 055 206

(51) Int. Cl.
     *A01B 71/06*        (2006.01)
     *A01D 90/12*        (2006.01)

(52) U.S. Cl.
     CPC ............... *A01B 71/06* (2013.01); *A01D 90/12* (2013.01); *A01B 71/066* (2013.01)
     USPC .......... 180/14.1; 280/494; 280/492; 180/14.4

(58) Field of Classification Search
     CPC .. B62K 25/283; B62K 11/02; B62K 2204/00; B62K 2208/00; B62K 11/04
     USPC ............ 172/76, 79; 180/14.1, 14.4; 280/482, 280/492, 494, 504, 515; 403/52, 53, 57
     See application file for complete search history.

(56) References Cited

U.S. PATENT DOCUMENTS

| | | | | |
|---|---|---|---|---|
| 4,090,725 | A | * | 5/1978 | Perin .............................. 172/272 |
| 4,099,594 | A | | 7/1978 | Smith et al. |
| 4,887,680 | A | * | 12/1989 | Nozaka et al. ............... 180/53.3 |
| 5,597,566 | A | * | 1/1997 | Huls ............................. 464/119 |
| 6,015,016 | A | | 1/2000 | Anderson et al. |
| 6,877,758 | B2 | * | 4/2005 | Colistro ........................ 280/494 |
| 7,913,782 | B1 | * | 3/2011 | Foss et al. .................... 180/14.4 |

FOREIGN PATENT DOCUMENTS

| | | |
|---|---|---|
| DE | 27 40 287 A1 | 3/1978 |
| DE | 27 54 871 A1 | 6/1979 |
| DE | 32 12621 A1 | 11/1982 |
| EP | 0 598 274 A1 | 5/1994 |

* cited by examiner

*Primary Examiner* — Joseph M Rocca
*Assistant Examiner* — Jacob Knutson
(74) *Attorney, Agent, or Firm* — The Law Office of Michael E. Kondoudis

(57) ABSTRACT

The invention relates to a drive train (1; 52) between a power take-off shaft (27) of a tractor unit (26) and the gearbox (34) of a trailer vehicle (33), the drawbar of which is coupled in a bottom hitching arrangement to the hitch (28) of the tractor unit (26), wherein the drive train (1; 52) extends above the drawbar beam. Depending on the rotational speed and length of the propeller shaft, a long propeller shaft may result problems in revolution that is agitated and vibratory. The novel drive exhibits smooth running properties and allows for easy handling.

8 Claims, 7 Drawing Sheets

DRIVE TRAIN BETWEEN THE POWER TAKE-OFF SHAFT OF A TRACTOR UNIT AND THE GEARBOX OF A TRAILER VEHICLE

Embodiments of the invention relates to a drive train between a power take-off shaft of a tractor unit and the gearbox of a trailer vehicle, the drawbar of which is coupled in a bottom hitching arrangement to the hitch of the tractor unit, wherein the drive train extends above the drawbar beam.

So as to improve the driving characteristics and driving safety of heavy or bulky towed vehicles, they are advantageously provided with drawbars for bottom hitching, such that they can be implemented as rigid or articulating drawbars.

These trailer vehicles are frequently work machines, the drive mechanisms of which are driven by the power take-off shaft of a tractor, wherein the options for use are very diverse. For example, there is a common use in agriculture where driven trailer vehicles are used as harvesting cars, farmyard manure spreaders, slurry tankers, large balers, and the like.

In known drive mechanisms, a propeller shaft is generally introduced between the gearbox of a trailer vehicle of the type mentioned above and the power take-off shaft of a tractor unit, preferably an agricultural tractor. The relatively large distance between the connecting points necessitates long propeller shafts, with these frequently reaching a critical speed range in the aforementioned uses at which, even with substantial overlap of the telescoping pipes, very agitated, vibrating revolutions take place, which are further intensified by flexural vibrations that build up in the drawbar when driving over uneven terrain, as a result of the drawbar load rocking up and down.

Because of the design, deflection angles occur on the drive propeller shaft and cause considerable fluctuations in the rotational speeds in the transmitting elements, this being still further intensified during cornering. Heavy and expensive large-angle constant velocity drive shafts are used so as to prevent the resulting unsteady operation.

In many cases, installing these heavy propeller shafts is impossible for one person to handle because attaching the propeller shaft to the input journal of the gearbox is made difficult by the heavy weight and the constricted situation between the holding arms of the drawbar.

Because of the position of the universal joint between the holding arms of the drawbar, and particularly during cornering, so as to prevent the laterally bending propeller shaft from striking against the holding arms, a drawbar width is required that would limit the maneuverability of the tractor unit and towed vehicle, because turning the tractor is possible only to a limited extent due to the rear wheels striking against the holding arms. The risk of this causing considerable damage to the expensive rear tires of the tractor is very high.

In addition, special uses require high ground clearances. One example is the creation of flat silos containing fodder for cattle. These flat silos are frequently created using forage wagons that are driven by a tractor serving as the tractor unit. The fodder contained in the forage wagon is deposited in the form of a silo heap by the forage wagon repeatedly driving over the heap, which successively increases in size, depositing one layer of fodder after another. So as to uniformly discharge the material load, a high ground clearance must be present in the front region of the forage wagon, so as to ensure that driving onto the silo heap that is created does not pose a problem, and so as to ensure that the receiving elements arranged in this front region do not pick up and push ahead any of the crop material when the tractor drives onto and over the heap, which would significantly impede passage over the heap due to jamming.

The required ground clearance is made possible by using what is known as an "articulating drawbar." In the normal position, known designs of articulating drawbars experience the same deficiencies as rigid drawbars. In addition, extending the telescopic pipes of the propeller shaft, and consequently decreasing the overlap of the telescopic pipes, considerably increases the vibration tendency of the propeller shaft when unloading the material load while the front forage wagon region is raised.

EP 0598174 B1 discloses a drive train between a power take-off shaft of a tractor unit and a gearbox of an attached vehicle, comprising a plurality of drive shafts which are connected to each other by couplings and joints. A portion of the drive train is integrated in the drawbar. The drawbar is a so-called rigid drawbar, which allows rotation between the tractor unit and a hauled vehicle only around a vertical axis, so that the hauled vehicle can follow the tractor unit, for example around curves. An articulating drawbar, which allows a rotational movement of the drawbar around a horizontal axis, is not provided.

A drive assembly for towed agricultural machines is known from DE 2740287 A1, which relates in particular to an improved assembly for supporting a gear train so as to accommodate bottoming out of a telescoping assembly in the gear train during sharp turns of the tractor relative to the towed vehicle. The driveline runs above the drawbar, which is again a rigid drawbar, without the option of rotation around a horizontal axis.

A drive train between a tractor unit and a trailer vehicle is also known from U.S. Pat. No. 6,015,016 A. A pivoting pillow block is provided for mounting the drive train when the vehicle is detached. The aim of this pillow block is that of simplifying and facilitating the ease of assembly, which is to say the coupling and decoupling of the propeller shaft. For this purpose, when the driveline is stopped, and preferably when the tractor unit is completely shut off, the pillow block is set up so that it assumes a position below the propeller shaft, supporting the same, so that the tractor unit can be decoupled and the propeller shaft is supported by the support stand. No support of the driveline by the pillow block while the propeller shaft is rotating, which is to say under load, is provided.

It is the object of the present invention to improve the smooth running of the drive elements between the tractor unit and towed vehicle and to prevent wear and breakage damage resulting therefrom. In addition, the handling when attaching the propeller shafts and the maneuverability of the tractor unit and towed vehicle are to be improved.

This object is achieved according to the invention by:
  providing the drawbar with holding arms, mounting the holding arms on pins and connecting them to the chassis of the towed vehicle, and engaging lifting cylinders at the ends of the holding arms, so that the cylinders are used to rotatably mount the drawbar about a center line, and
  temporarily supporting the drive train between the power take-off shaft of the tractor unit and the input journal of the trailer vehicle by way of a pillow block that is disposed on the drawbar.

Such a system constitutes what is known as an "articulating drawbar," which can be used to implement the ground clearance, which is between the front of the towed vehicle and the ground, and which is required for special applications.

By temporarily supporting the drive train, the distance to be bridged by the propeller shaft is reduced, and consequently so is the weight of the individual parts. A lighter propeller shaft that is only equipped with a wide-angle constant velocity joint and a universal joint can thus be used. In addition, the point of connection at the towed vehicle is shifted toward the tractor unit into a region that is more accessible, improving the handling, notably when attaching and removing the propeller shaft.

It is particularly advantageous when, in the aforementioned embodiment comprising the articulating drawbar, the drive train between the pillow block and the input journal of the trailer vehicle comprises a joint, the center of which is located on a center line passing through the pins. The center line of the pins is arranged such that it traverses, or approximately traverses, the center of the double joint. The joint can preferably be a double joint. Arranging the joint center on the center line is particularly advantageous when the front of the towed vehicle is raised or lowered by way of the articulating drawbar, because raising the front would otherwise cause a considerably change in the length of the drive train, which would have to be compensated for by sliding the profiled pipes of the propeller shaft, which are present in the drive train, inside one another.

It is also favorable for the pillow block to be disposed between the holding arms of the articulating drawbar so that at least the propeller shaft receiving journal of a shaft that is mounted in the pillow block is located in front of an intermediate space formed by the holding arms. This facilitates handling because reaching between the holding arms is not required when installing the propeller shaft.

A double joint, which is preferably equipped with an overload coupling, is used to bridge the space between the output journal of the pillow block and the input journal of the gearbox between the more closely arranged holding arms.

By arranging the pillow block in front of the holding arms, basically as seen looking in the direction of the tractor unit, a narrower design of the drawbar becomes possible. A narrower drawbar construction and a decreased turning clearance circle resulting therefrom also reduce the risk of tire damage when steering the tractor unit.

It is advantageous for all embodiments, if the drive train comprises a joint, which has a slip yoke, and which is connected to an output journal of the shaft mounted in the pillow block, and if the joint is arranged on the output journal of the shaft so as to be axially displaceable. Even minor axial play allows small longitudinal changes that occur in the drive train under load to be compensated for and prevents stress between the components.

In a preferred embodiment, the joint, which is contained in the drive train and located between the pillow block and input journal of the trailer vehicle, comprises a protective funnel, which forms a unit together with a guard covering the output journal of the shaft. By connecting the protective funnel of the double joint to the fixed guard of the input journal, the connected protective funnel is prevented from turning without using an otherwise customary retaining element, such as a retaining chain. This improves occupational safety and also reduces the risk of dirt particles finding their way to the moving parts of the drive mechanism.

The invention will be described hereafter based on examples, and is shown in the drawings.

Figure 1:
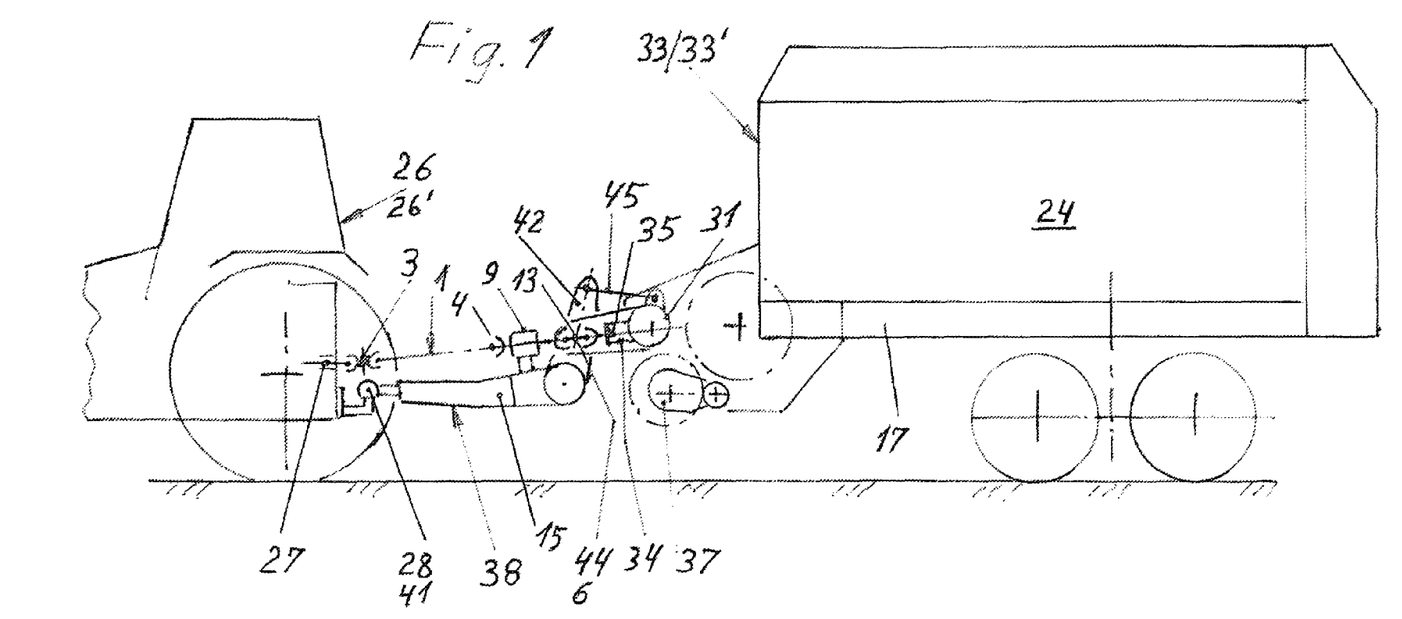
FIG. 1 shows the arrangement of a drive train on an articulating drawbar for bottom hitching between a tractor and a forage wagon in the transport position.

FIG. 1 indicates a tractor unit 26, which in this example is a tractor 26' with tires 29. The tractor 26' is connected to a towed vehicle 33 by way of an articulating drawbar 38 and via a drive train 1 arranged thereabove. The towed vehicle 33 is a forage wagon 33'. Both vehicles together form a rig. Articulating drawbars 38 are primarily used in forage wagons 33' or harvesting machines that can pick up fodder from the ground using a collection drum 37.

Figure 2:
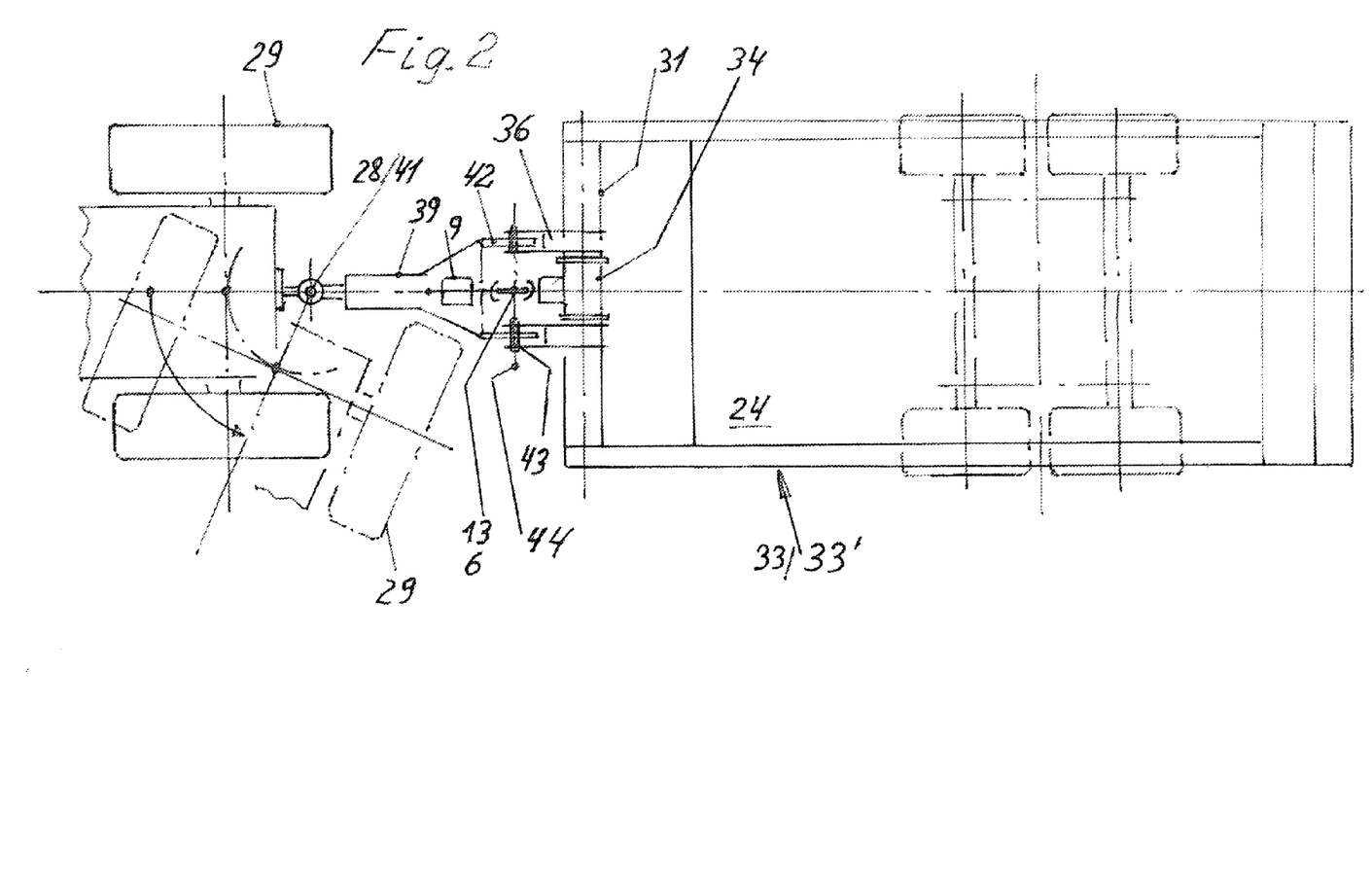
FIG. 2 shows a top view onto FIG. 1, which indicates the maximum possible turning for the tractor during cornering.

FIG. 2 shows a top view of the rig of FIG. 1, wherein the maximum turning of the tractor 26' during cornering is also apparent. The position when driving straight ahead is shown with a solid line, while the position with maximum turning is shown with a dashed line. In each case the positions of the tires 29 are apparent. Improved maneuverability of the rig composed of the tractor 26' and towed vehicle 33 is achieved during cornering because the rear tires 29 of the tractor are provided with more clearance to the drawbar beam 39 given the narrow width of a rigid drawbar 15 or of the articulating drawbar 38. This decreases the turning radius of the rig.

Figure 3:
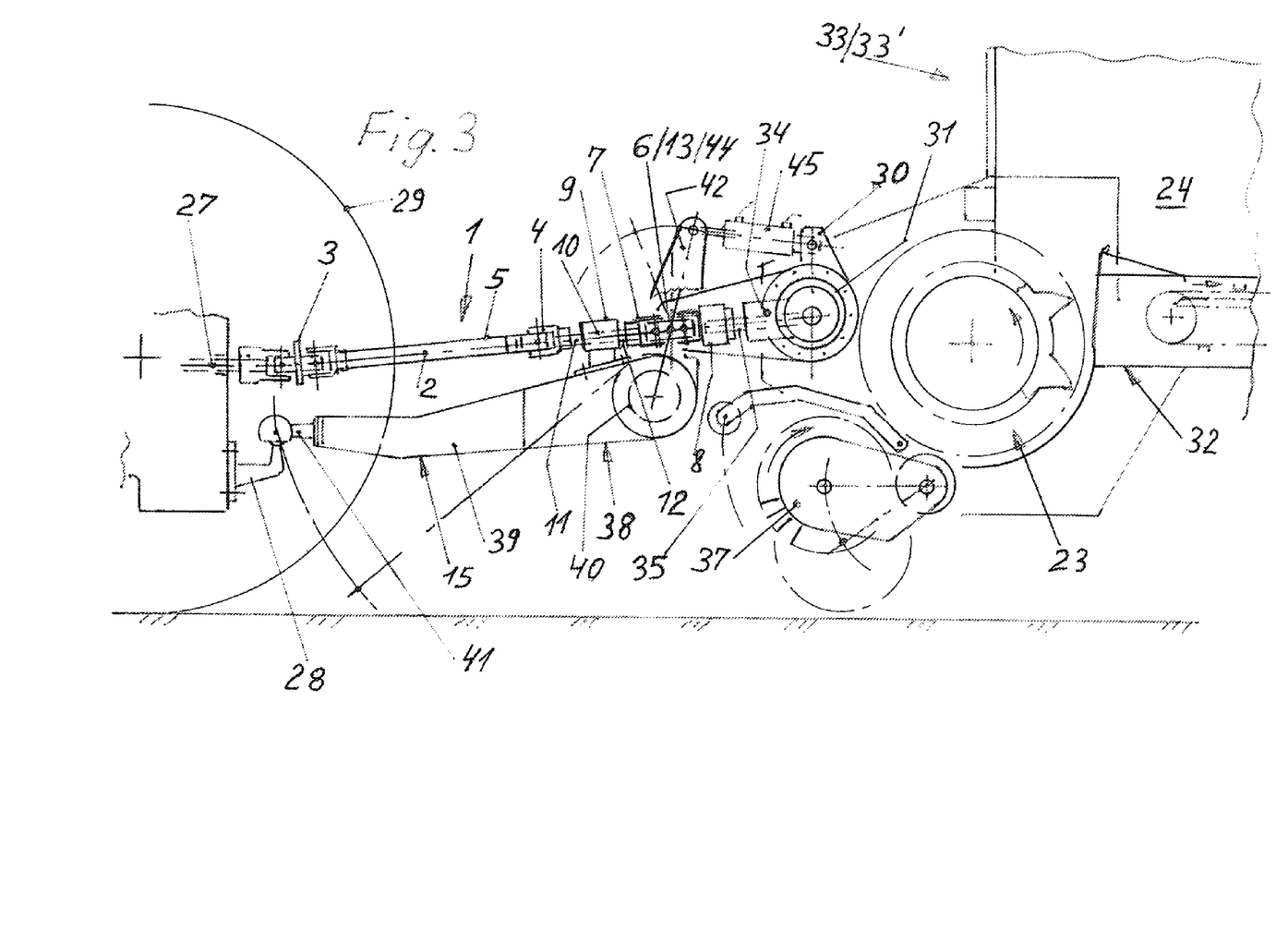
FIG. 3 shows the position of the drive train when the articulating drawbar is lowered.
Figure 4:
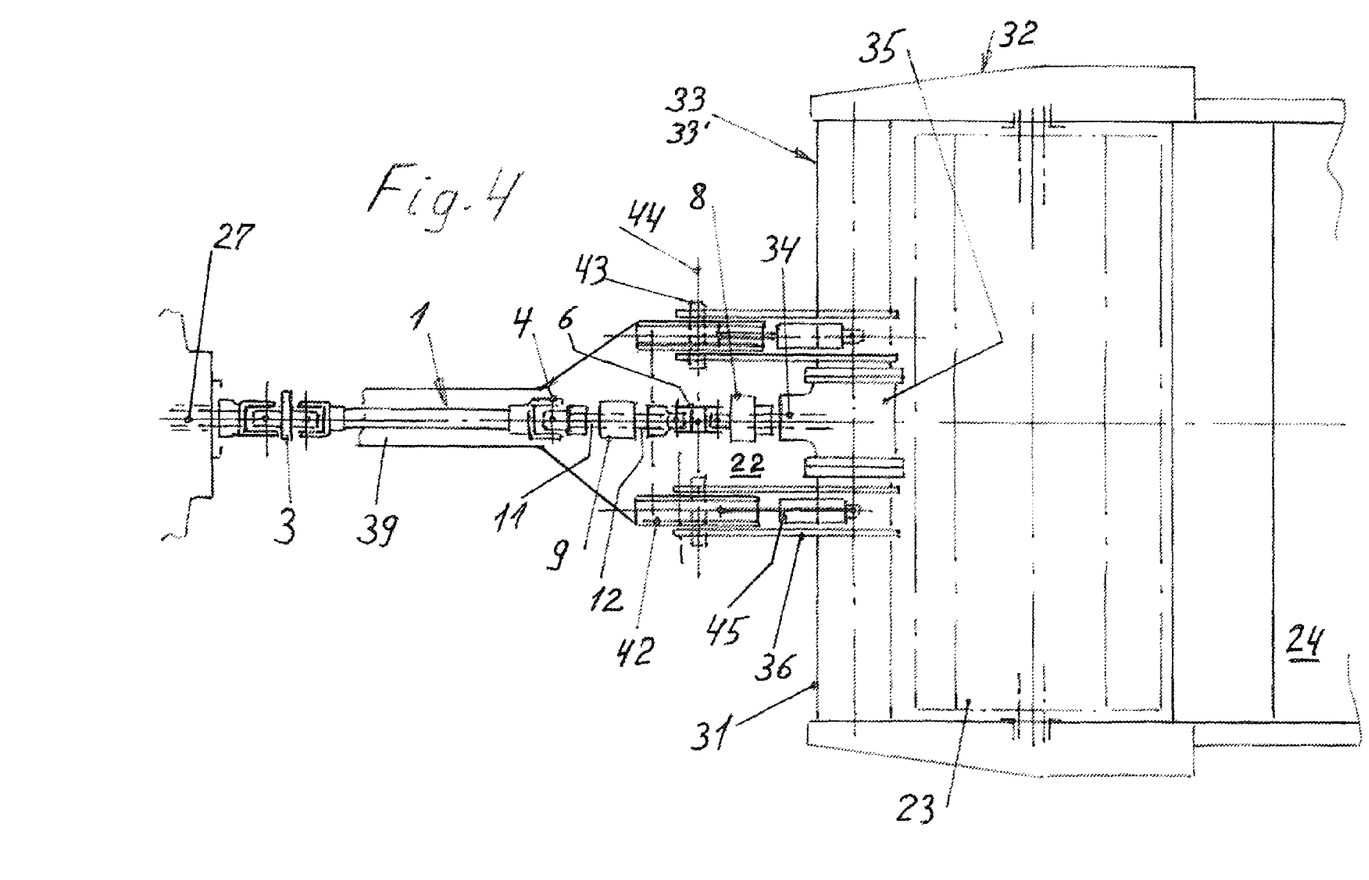
FIG. 4 shows a top view onto FIG. 3.

FIG. 3 (side view) and FIG. 4 (top view) show a forage wagon 33' that is attached behind a tractor unit 26, preferably a tractor 26', which is not shown in detail. The tractor 26' is connected to the forage wagon 33' via an articulating drawbar 38. The tractor 26' is additionally connected to the forage wagon 33' by the drive train 1, which is disposed on an articulating drawbar 38 for bottom hitching between the power take-off shaft 27 of the tractor and the input journal 35 of a gearbox 34 of the forage wagon 33'. The drive train 1 is temporarily supported on the articulating drawbar 38 by way of a pillow block 9. It comprises: a propeller shaft 2 having a large-angle constant velocity joint 3; a universal joint 4; and profiled pipes 5. A shaft 10, which forms part of the drive train 1 and is provided with a drive journal 11 and an output journal 12, is mounted in the pillow block 9. The drive train is further provided with a double joint 6, which is equipped with a slip yoke 7 and an overload coupling 8. The slip yoke 7 can be axially displaced on the output journal 12 so that the relatively small longitudinal changes that occur between the output journal 12 and the double joint 6 in particular applications when pivoting the articulating drawbar 38 are compensated.

The articulating drawbar 38 comprises a narrow drawbar beam 39, which widens at the end so as to accommodate a transverse pipe 40, and at the end face of which a tow ball coupling 41 is disposed in the region of the tractor. Holding arms 42 are provided on the transverse pipe 40, which together with bearing bushings for receiving pins 43 are used for the connection to the chassis 32 of the forage wagon 33'. The pillow block 9 is disposed on the upper face of the drawbar beam 39.

The drive train 1 is connected to the power take-off shaft 27 of the tractor by way of the slip yoke of the large-angle constant velocity joint 3. The universal joint 4 is placed on the drive journal 11 of the shaft 10, the drive journal being provided with a multi-spline profile. The double joint 6 is installed in a stationary manner on the input journal 35 of the gearbox 34 of the forage wagon 33' by way of the multi-spline bushing of the overload coupling 8. A slip yoke 7 is arranged on the multi-spline profile of the output journal 12 so as to be axially displaceable.

The drive train 1 transmits the optimal rotational power thereof when it is extended, which is to say when all the components from the input point to the delivery point, including the pillow block 9, are in a straight alignment. Because the maximum load values occur when picking up fodder, with the articulating drawbar 38 being in the lowered position, the straight alignment is selected for this use.

When used while driving on roads, the articulating drawbar 38 is likewise in the lowered position. The collection drum 37 of the forage wagon 33' is raised, and the drive train 1 is almost extended and not activated.

During use, such as when picking up fodder, the collection drum 37 is lowered to the vicinity of the ground and preferably picks up fodder lying on the ground in windrows. The fodder is fed to a pressing device 23, which pushes the fodder into a storage chamber 24. The necessary driving power is transmitted from the power take-off shaft 27 of the tractor 26 to the input journal 35 of the forage wagon 33' via the drive train 1', which here is approximately in the extended position.

Figure 5:
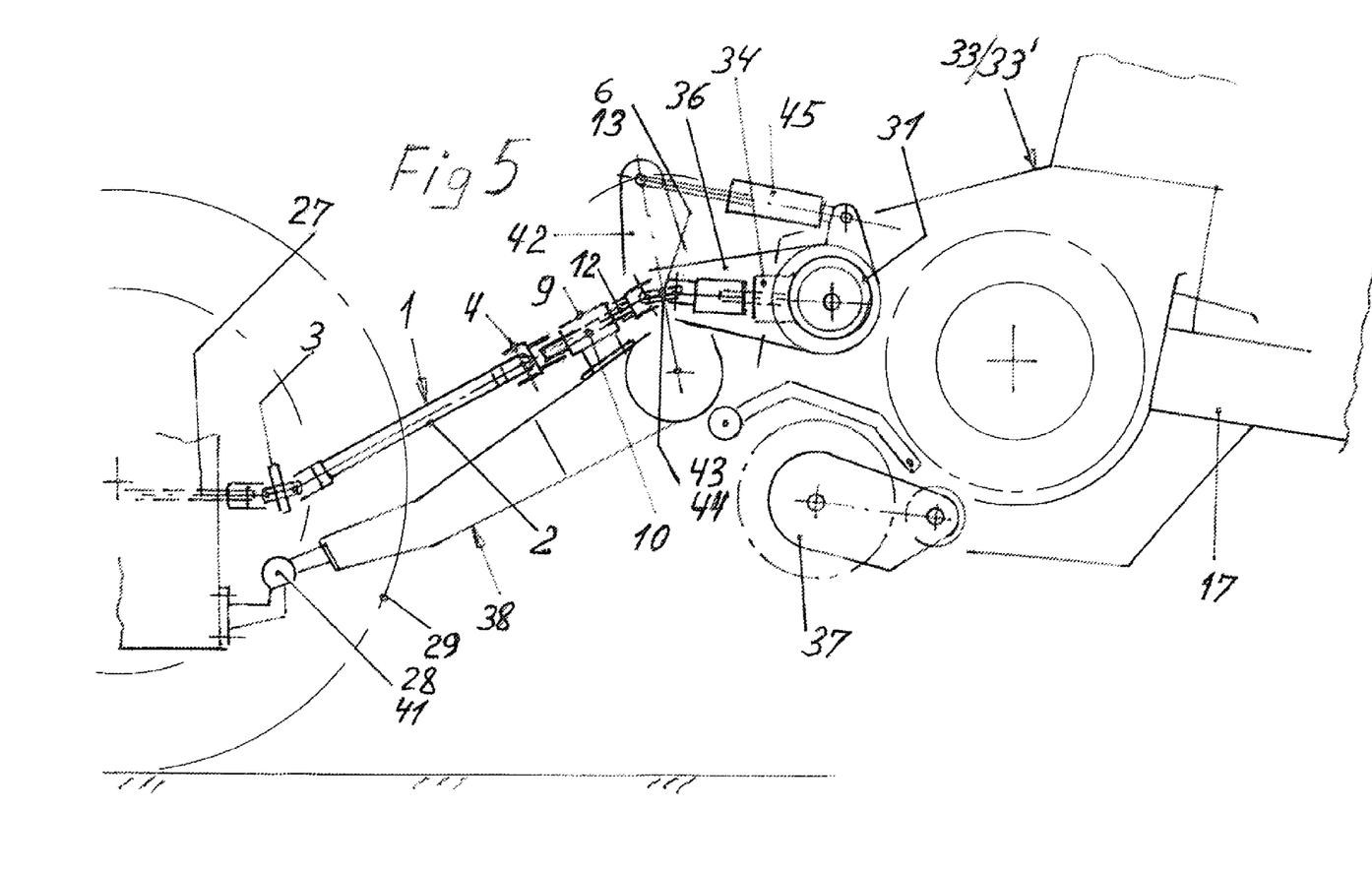
FIG. 5 shows the position of the drive train when the articulating drawbar is raised.

FIG. 5 shows the position of the drive train 1 on a raised articulating drawbar 38. Raising the articulating drawbar is generally necessary when unloading and spreading the fodder located in the storage chamber 24, because the region in which a flat silo is to be created must be repeatedly traveled over, depositing the fodder in layers in the process. The resulting fodder heap, which forms the flat silo later on, has an ascending on-ramp at one end and a descending off-ramp at the other end. For the tractor, with the forage wagon 33' attached thereto, to be able to cope with the on and off ramps without any contact occurring in the region of the forage wagon front section between the fodder and this front section, as great a ground clearance as possible is required when traveling over the heap. To achieve this, the articulating drawbar 38 is pivoted about the center line 44 extending through the pins 43 by way of two lifting cylinders 45. This creates a deflection angle in the region of the double joint 6. The rotational movements of the drive can still be uniformly transmitted.

When the articulating drawbar 38 is raised, such as when unloading fodder onto flat silos, the loads that occur are not as high, so that the stresses rising in the drive train, and more particularly in the double joint 6, due to the changed deflection angles remain within permissible limits.

With uses that do not require an articulating drawbar, it is possible to disengage the drawbar by replacing the lifting cylinders 45 with rigid supports.

Figure 6:
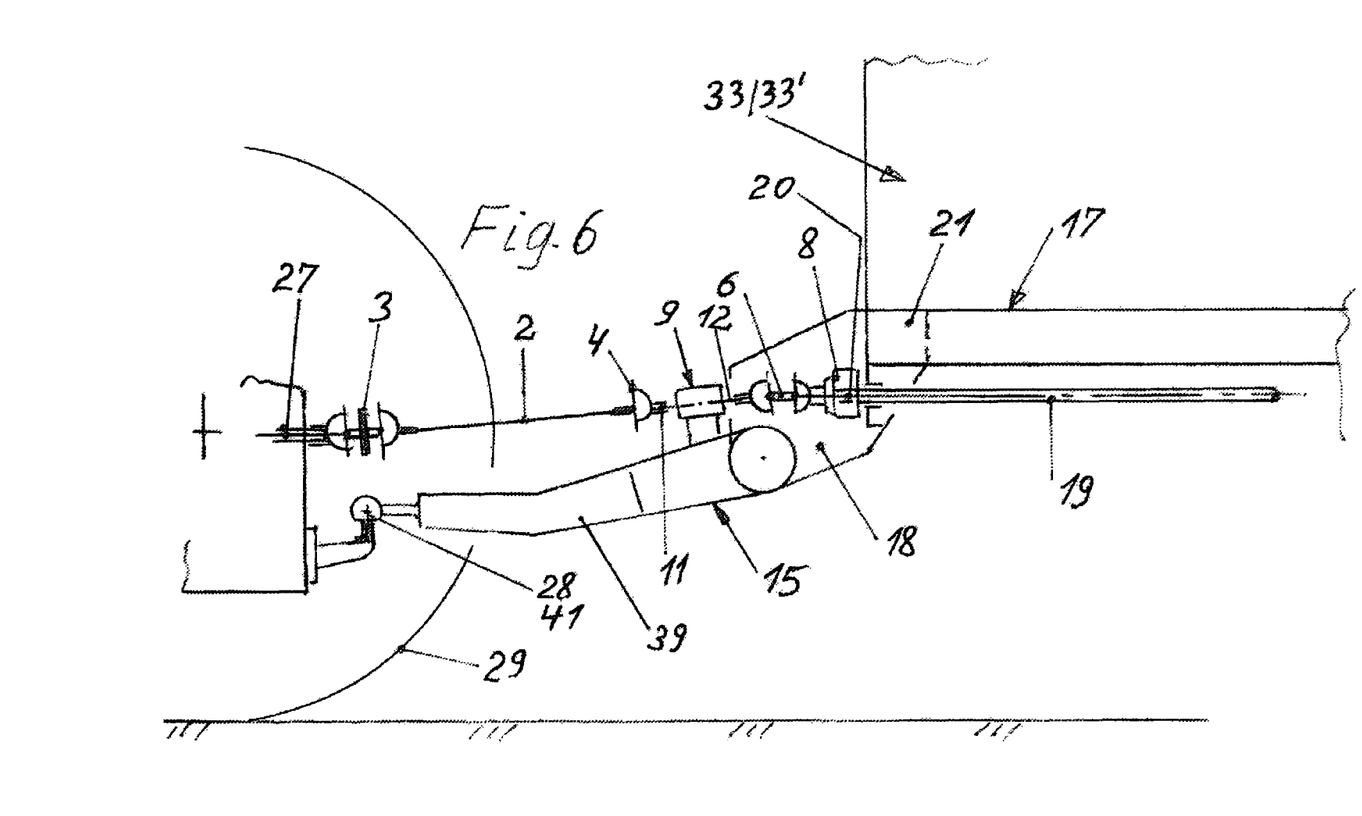
FIG. 6 shows the arrangement of the drive train on a rigid drawbar.

FIG. 6 shows the exemplary embodiment of a towed vehicle comprising a rigid drawbar 15. Such a rigid drawbar 15 is used when a more complex articulating drawbar is expendable. For example, this is the case with machine groups such as farmyard manure spreaders, slurry tanks, transport trailers, and the like.

The rigid drawbar 15 is rigidly connected to the chassis 17 of a farmyard manure spreader 33". The drawbar beam 39 is rigidly connected to the end face of the chassis 17 at the transverse beam 21 by way of connecting elements 18. The connecting journal 20 of the drive shaft 19 is disposed between the connecting elements 18. All advantageous characteristics of the drive train 1 already mentioned for the articulating drawbar design also apply to the rigid drawbar 15.

Figure 7:
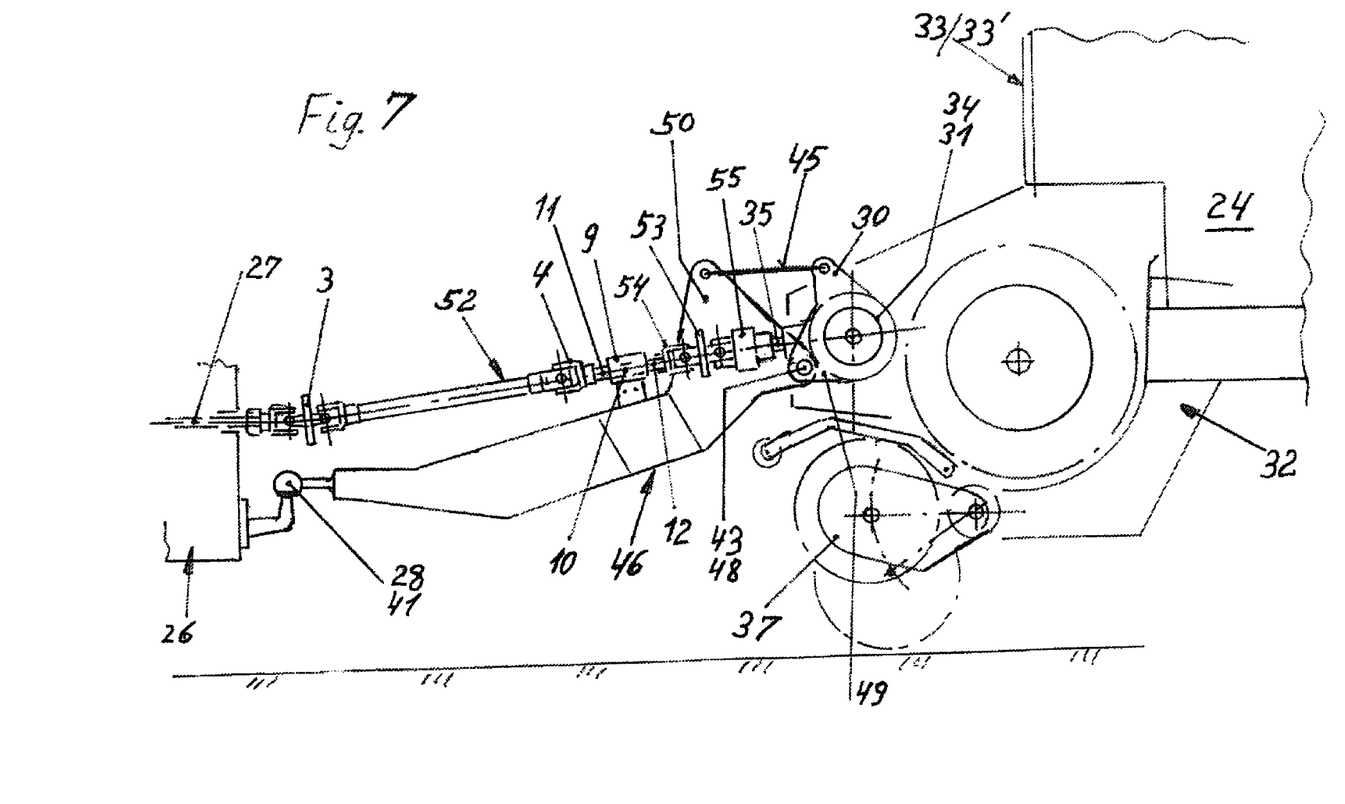
FIG. 7 shows an arrangement of a large-angle constant velocity propeller shaft on an articulating drawbar.

FIG. 7 shows an additional exemplary embodiment of a forage wagon 33' comprising an articulating drawbar 46. The articulating drawbar 46 is mounted on pins 43 on receiving blocks 49 on the transverse pipe 31 by way of the holding arms 50 and can be pivoted by way of the lifting cylinders 45. The center line 48 of the pins 43 does not pass through the center of a double joint here. So as to optimize the running properties of the drive train 52, a large-angle constant velocity joint 53 is advantageously equipped with an overload coupling instead of the double joint on the output side. The large-angle constant velocity joint 53 is connected in a stationary manner to the input journal 35 of the gearbox 34. And by way of the slip yoke 54, it is arranged axially displaceably from the output journal 12 of the shaft 10 of the pillow block 9. The relatively small longitudinal changes that occur between the output journal 12 and large-angle constant velocity joint 53 when pivoting the articulating drawbar 46 can be compensated for by the axial displaceability.

The drive train 1 is protected from contact on all moving parts by commercially available protective devices stipulated by law, which are not shown here.

REFERENCE NUMERALS 1 drive train
2 propeller shaft
3 large-angle constant velocity joint
4 universal joint
5 profiled pipe
6 joint (double joint)
7 slip yoke
8 overload coupling
9 pillow block
10 shaft
11 receiving journal (of the shaft 10)
12 output journal (of the shaft 10)
13 center
15 drawbar
16
17 chassis
18 connecting element
19 drive shaft
20 input journal (on towed vehicle 33")
21 transverse beam
22 intermediate space
23 pressing device
24 storage chamber
25
26 tractor unit
26' tractor
27 power take-off shaft
28 hitch (tow ball)
29 rear tire
30 holder
31 transverse pipe
32 chassis
33 towed vehicle
33' forage wagon
33" farmyard manure spreader
34 gearbox
35 input journal (on towed vehicle 33')
36 receiving block (in the variant "rotational axis passes through center of joint")
37 collection drum
38 articulating drawbar (in the variant "rotational axis passes through center of joint")
39 drawbar beam
40 transverse pipe
41 tow ball coupling
42 holding arms
43 pin
44 center line
45 lifting cylinder 46 articulating drawbar (for variant "with joint 53" (FIG. 7))
47
48 center line
49 receiving block (for variant "with joint 53" (FIG. 7))
50 holding arms
51
52 drive train (for variant "with joint 53" (FIG. 7))
53 joint (large-angle constant velocity joint)
54 slip yoke (for variant "with joint 53" (FIG. 7))
55 overload coupling (for variant "with joint 53" (FIG. 7))

The invention claimed is:

1. A towed vehicle (33) comprising a chassis (17) and a drawbar (15) having a drawbar beam (39) for hitching to a tractor unit (26), and comprising a drive train (1), which can be connected to a power take-off shaft (27) of the tractor unit (26), wherein, in a hitched condition,
the drive train (1) is disposed between the power take-off shaft (27) of the tractor unit (26) and a gearbox (34) of the towed vehicle (33) that comprises an input journal (20; 35),
the drawbar (15) is coupled in a bottom hitching arrangement to a hitch (28) of the tractor unit (26),
the drive train (1) extends above the drawbar beam (39), and
the drive train (1) is detachably mounted between the power take-off shaft (27) of the tractor unit (26) and the input journal (35) of the trailer vehicle (33) by way of a pillow block (9) that is disposed on the drawbar (15),
wherein, when viewed from above, the drawbar (15) has a y-shaped configuration with two opposing holding arms (42; 50) that are respectively hingibly connected by pins (43) to cooperating arms of a receiving block (36) of the towed vehicle (33), the pins (43) being discrete and spacedly disposed from each other,
wherein lifting cylinders (45) engage at the ends of the holding arms (42; 50), the cylinders being usable to rotate the holding arms of the drawbar (15) about a center line (44) that extends through the pins (43), and
wherein the drive train (1) includes a joint (6) between the pillow block (9) and the input journal (20; 35) of the towed vehicle (33), a center (13) of the joint (6) being located on the center line (44) and in the space between the pins.

2. The towed vehicle (33) of claim 1, wherein the pillow block (9) comprises a shaft (10) having a receiving journal (11) for a propeller shaft (2), and
wherein the pillow block (9) is disposed between the holding arms (42; 50) so that the receiving journal (11) is located in front of an intermediate space (22) formed by the holding arms (42; 50) relative to a forward direction of travel of the towed vehicle.

3. The towed vehicle (33) of claim 1, wherein the pillow block (9) is disposed in front of the holding arms (42; 50) relative to a forward direction of travel of the towed vehicle.

4. The towed vehicle (33) of claim 1, wherein the joint (6) is a double joint that includes a slip yoke (54), and
wherein the double joint is connected to an output journal (12) of a shaft (10) mounted in the pillow block (9) and is disposed on the output journal (12) of the shaft (10) so as to be axially movable on the output journal.

5. The towed vehicle of claim 4, wherein the draw bar swivels about a horizontal axis that is lower than and in parallel with that of the double joint.

6. The towed vehicle of claim 4, wherein the draw bar flexes vertically about a horizontal axis that is aft of the double joint relative to the towed vehicle.

7. The towed vehicle (33) of claim 1, wherein the joint (53) is a large-angle constant velocity joint that includes a slip yoke (54), and
wherein the large-angle constant velocity joint is connected to an output journal (12) of a shaft (10) mounted in the pillow block (9) and is disposed on the output journal (12) of the shaft (10) so as to be axially movable on the output journal.

8. The towed vehicle of claim 1, wherein the joint and the articulated draw bar both have a respective axis of articulation, and these axes coincide.

* * * * *